(12) United States Patent
Abdel-Mottaleb

(10) Patent No.: US 6,424,789 B1
(45) Date of Patent: Jul. 23, 2002

(54) SYSTEM AND METHOD FOR PERFORMING FAST FORWARD AND SLOW MOTION SPEED CHANGES IN A VIDEO STREAM BASED ON VIDEO CONTENT

(75) Inventor: Mohamed S. Abdel-Mottaleb, Ossining, NY (US)

(73) Assignee: Koninklijke Philips Electronics N.V., New York, NY (US)

( * ) Notice: Subject to any disclaimer, the term of this patent is extended or adjusted under 35 U.S.C. 154(b) by 0 days.

(21) Appl. No.: 09/375,950

(22) Filed: Aug. 17, 1999

(51) Int. Cl.[7] .................................................. H04N 5/93
(52) U.S. Cl. ............................ 386/52; 386/68; 348/700
(58) Field of Search ........................... 386/1, 4, 45–46, 386/52, 68–69, 81–82, 125–126; 348/700, 701, 702

(56) References Cited

U.S. PATENT DOCUMENTS

| | | | |
|---|---|---|---|
| 5,099,322 A | | 3/1992 | Gove |
| 5,204,706 A | | 4/1993 | Saito |
| 5,594,676 A | | 1/1997 | Greggain et al. |
| 5,835,163 A | * | 11/1998 | Liou et al. .................. 348/700 |
| 6,188,831 B1 | * | 2/2001 | Ichimura ..................... 386/69 |
| 6,289,165 B1 | * | 11/2001 | Abecassis .................... 386/46 |

FOREIGN PATENT DOCUMENTS

| | | | |
|---|---|---|---|
| GB | 2264020 A | 8/1993 | |

OTHER PUBLICATIONS

"On Fast Microscopic Browsing of MPEG Compressed Video" by Boon–Lock Yeo, XP 000871357, Multimedia Systems, vol. 7, 1999.

"An Integrated System for Content–Based Video Retrieval and Browsing" by H.J, Zhang et al., Pergamon Press, vol. 30, No. 4 1997.

"Content–Based Browsing of Video Sequences", by F. Arman et al, Proceedings ACM Multimedia, 1994, pp. 97–103.

"PC Based Video Query System "(VQS), by Y. Nakajima et al., No. 155, pp. 37–52, Mar. 1996.

* cited by examiner

*Primary Examiner*—Thai Tran
*Assistant Examiner*—Christopher Onuaku
(74) *Attorney, Agent, or Firm*—Russell Gross

(57) ABSTRACT

There is disclosed, for use in a video editing system, a video processing device capable of receiving a first video clip containing at least one shot (or scene) consisting of a sequence of uninterrupted related frames and performing fast forward or slow motion special effects that vary according to the activity level in the shot. The video processing device comprises an image processor capable of identifying the shot and determining a first activity level within at least a portion of the shot. The image processor then performs the selected speed change special effect by adding frames or deleting frames in the first portion in response to the activity level determination, thereby producing a modified shot.

24 Claims, 3 Drawing Sheets

SYSTEM AND METHOD FOR PERFORMING FAST FORWARD AND SLOW MOTION SPEED CHANGES IN A VIDEO STREAM BASED ON VIDEO CONTENT

TECHNICAL FIELD OF THE INVENTION

The present invention is directed, in general, to video processing techniques and, more specifically, to a system and method for implementing speed-change special effects in a video stream based on the level of activity in the video content.

BACKGROUND OF THE INVENTION

Speed-change special effects., such as "fast forward" and "slow motion," are commonly used in film and video. Both of these special effects are implemented using well-known techniques. The traditional approach for implementing a fast-forward speed change is to sub-sample the normal-speed video stream by dropping frames at a pre-determined rate, such as every other frame, every third frame, every fourth frame, every fifth frame, etc. The traditional approach for implementing a slow-motion speed change is to repeat frames in the normal-speed video stream.

Both techniques suffer significant drawbacks. In the case of a fast-forward speed change, dropping frames arbitrarily from a normal-speed stream of video frames may result in particular shots being under-represented, particularly very brief shots and shots having a high activity level. A "shot" is a sequence of frames that produce a single continuous scene, without a change in camera angle. "Activity level" refers to the amount of change in the content of successive video frames. For example, a car chase scene or a battle scene are high-activity shots. A scene of a person sitting passively in a chair, such as a news anchorman, is an example of a low-activity shot. In the case of a slow-motion speed change, repeating frames arbitrarily in the normal-speed stream of video frames may result in a jerky motion.

There is therefore a need in the art for improved video-processing techniques for implementing speed changes in a video stream. In particular, there is a need in the art for systems and methods for performing fast-forward special effects that do not under-represent high-activity shots and shots of short duration. There is a further need for systems and methods for performing slow-motion special effects that do not result in a jerky motion in the final slow-motion shot.

SUMMARY OF THE INVENTION

To address the above-discussed deficiencies of the prior art, the present invention provides, broadly, systems and methods for altering the number of frames (i.e., adding frames or deleting frames) in a shot at rates that vary according to the activity level in the video content of the shot.

For instance, if a user selects fast forward for a particular video clip, the present invention will determine the activity level of each individual shot in the video clip and will adjust the rate at which frames are dropped in each shot according to the activity level in each shot. For example, if two persons are calmly talking in a shot, the activity level will be determined to be low and the present invention will drop frames at a comparatively high rate (e.g., drop every second frame) during fast forward. On the other hand, if two persons are engaged in a fistfight in a shot, the activity level will be determined to be high and the present invention will drop frames at a comparatively low rate (e.g., drop every fourth frame) during fast forward.

In an advantageous embodiment of the present invention, the rate at which frames are dropped may be modified "on-the-fly" if the level of activity changes during a single shot. For example, if two person are calmly talking at the start of a shot, and then begin to fight in the middle of the shot, the activity level changes from low to high and the rate at which frames are dropped is automatically modified during fast forward to compensate for the change of activity level in the shot.

Similarly, if a user selects slow motion for a particular video clip, the present invention will determine the activity level of each individual shot in the video clip and will adjust the rate at which frames are added and "morphed" in each shot according to the activity level in each shot. Morphing and other similar techniques are well known in the art and are used to reduce "jerkiness" in a sequence of frames. Any of these well-known techniques may be used in conjunction with the present invention to implement speed-change special effects, such as slow motion and, perhaps, fast forward.

To continue with the prior example, if two persons are calmly talking in a shot, the activity level is determined to be low and frames are added and morphed at a comparatively low rate (e.g., add one frame for each three in the original clip) during slow motion. On the other hand, if two persons are engaged in a fistfight in a shot, the activity level is determined to be high and frames are added and morphed at a comparatively high rate (e.g., add one frame for each frame in the original clip) during slow motion.

In an advantageous embodiment of the present invention, the rate at which frames are added and morphed may be modified "on-the-fly" if the level of activity changes during a single shot. For example, if two person are calmly talking at the start of a shot, and then begin to fight in the middle of the shot, the activity level will change from low to high and the rate at which frames are added and morphed is automatically modified during slow motion to compensate for the change of activity level in the shot.

Accordingly, in one embodiment of the present invention, there is provided, for use in a video editing system, a video processing device capable of receiving a first video clip comprising at least one shot, wherein the at least one shot comprises a sequence of related frames, and modifying the video clip to perform a selected speed change special effect. The video processing device comprises an image processor capable of identifying the at least one shot and determining a first activity level within at least a first portion of the at least one shot, wherein the first activity level indicates a rate of change of video content between at least a first frame and a second frame in the at least a first portion. The image processor performs the selected speed change special effect by one of adding frames and deleting frames in the at least a first portion in response to the first activity level determination, thereby producing a modified at least one shot.

According to one embodiment of the present invention, the image processor is capable of distinguishing the at least one shot and a second shot in the first video clip and separating the at least one shot and the second shot into distinct segments prior to performing the selected speed change special effect.

According to another embodiment of the present invention, the image processor is capable of determining a second activity level within at least a first portion of the second shot and performing the selected speed change special effect by one of adding frames and deleting frames in the at least a first portion of the second shot in response to the second activity level determination, thereby producing a modified second shot.

According to still another embodiment of the present invention, the image processor is capable of combining the modified at least one shot and the modified second shot to thereby produce a modified first video clip.

According to yet another embodiment of the present invention, the selected speed change special effect is fast forward and the image processor deletes frames at a first predetermined rate if the first activity level does not exceed a first predetermined threshold.

According to a further embodiment of the present invention, the image processor deletes frames at a second predetermined rate lower than the first predetermined rate if the first activity level does exceed the first predetermined threshold.

According to a still further embodiment, of the present invention, the selected speed change special effect is slow motion and the image processor adds frames at a first predetermined rate if the first activity level does not exceed a first predetermined threshold.

According to a yet further embodiment of the present invention, the image processor adds frames at a second predetermined rate higher than the first predetermined rate if the first activity level does exceed the first predetermined threshold.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" or "processor" means any device, system or part thereof that controls at least one operation, such a device may be implemented in hardware, firmware or software, or some combination of at least two of the same. It should be noted that the functionality associated with any particular controller or processor may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

FIGS. 1 through 4, discussed below, and the various embodiments used to describe the principles of the present invention in this patent document are by way of illustration only and generally should not be construed in any way to limit the scope of the invention. Those skilled in the art will understand that the principles of the present invention may be implemented in any suitably arranged video editing system.

Figure 1:
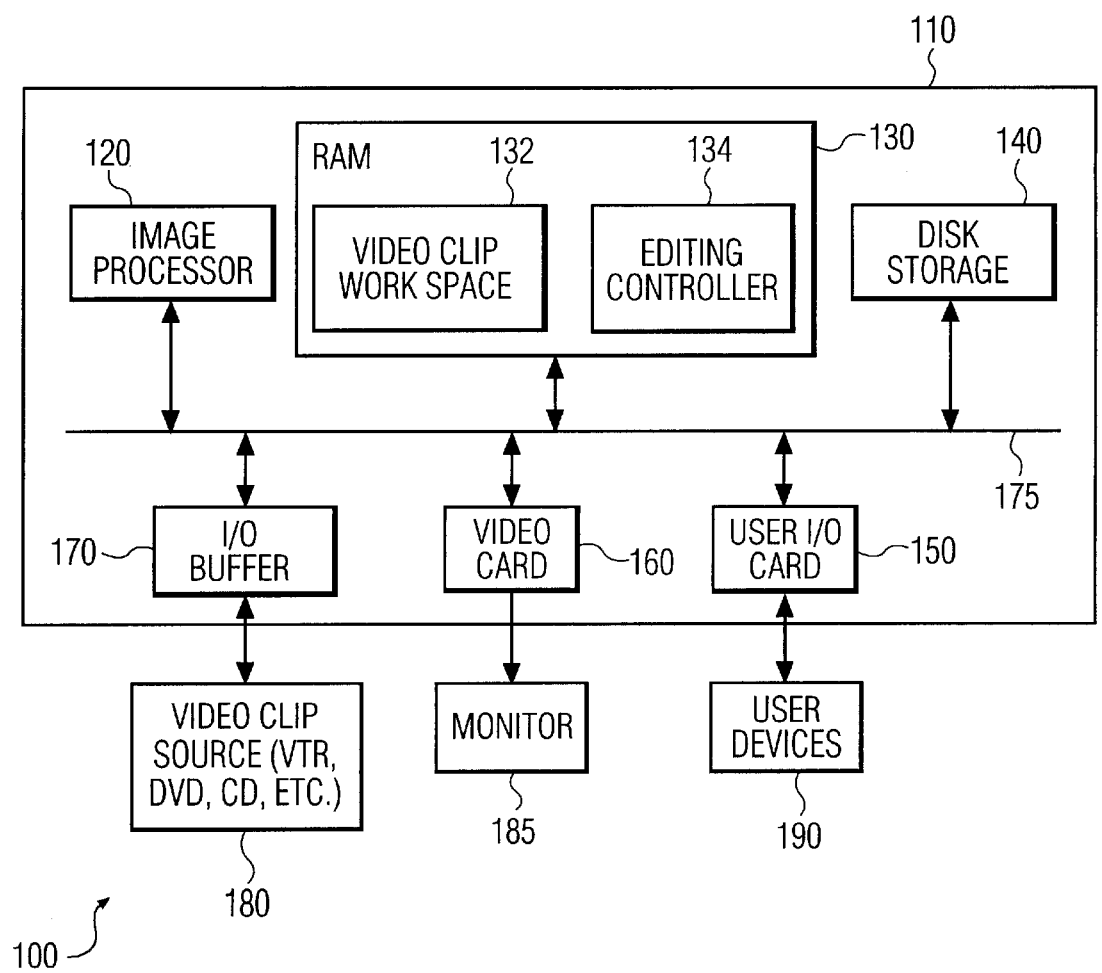
FIG. 1 illustrates an exemplary video editing system in accordance with one embodiment of the present invention.

Turning to FIG. 1, illustrated is an exemplary video editing system (generally: designated 100) in accordance with one embodiment of the present invention. Video editing system 100 comprises video processing system 110, video clip source 180, monitor 185, and user devices 190. Video processing system 110 provides means for editing received video images. This includes accomplishing the editing process of the present invention by which the rate of movement of images within a video shot is increased or decreased with respect to the degree of movement between frames.

Video clip source 180 provides for the transfer of video clips to and from video processing system 110. Video clip source 180 may be one or more of a video tape recorder (VTR), a digital video disc (DVD) player/recorder, a compact disc (CD) player/recorder, or any similar device capable of providing and storing digitized video images, with or without audio. Video clip source 180 may only have storage capability for a few clips of short length or bulk storage for multiple clips, including longer length digitized video images. Video clip source 180 may provide video data in any known format, such as, for example, D-1 format.

Monitor 185 provides the means for display of the video image and may be equipped for audio, as required. User device(s), 190 represents one or more peripheral devices that may be manipulated by the user of video editing system 100 to provide user inputs for the system. Exemplary peripheral user input devices include a computer mouse, a keyboard, a lightpen, a joystick, a touch-table and associated stylus, or any other device that may selectively be used to enter, to select, and to manipulate data, including all or portions of the displayed video image(s). User device(s) 190 is capable of at least selecting the desired speed-change special effect for selected shots. User devices 190 may also include output devices, such as a color printer, for example, which can be utilized to capture a particular image, frame, or range of frames.

Video processing system 110 comprises image processor 120, random access memory (RAM) 130, disk storage 140, user input/output (I/O) card 150, video card 160, I/O buffer 170, and processor bus 175. Processor bus 175 provides means for data transfer between the various elements of video processing system 110. RAM 130 further comprises video clip work space 132 and editing controller 134.

Image processor 120 provides over-all control for video processing system 110 and performs the image processing needed to implement the selected speed-change special effect. This includes implementation of editing processes, processing of digitized video images for transfer to monitor 185 or for storage in disk storage 140, and control of data transfer between the various elements of the video processing system. The requirements and capabilities for image processor 120 are well known in the art and need not be described in greater detail other than as required for the present invention.

RAM 130 provides random access memory for temporary storage of data produced by video processing system 110, which is not otherwise provided by components within the system. RAM 130 includes memory for video clip work space 132, editing controller 134, as well as other memory required by image processor 120 and associated devices. Video clip work space 132 represents the portion of RAM 130 in which video images associated with a particular video clip are temporarily stored during the editing process. Video clip work space 132 provides means for modifying frames within a clip without impacting the original data so that the original data can be recovered, as required.

According to the exemplary embodiment, editing controller 134 represents a portion of RAM 130 that stores a plurality of executable instructions that may be executed by image processor 120 to perform the fast forward and slow motion special effects. Editing controller 134 may execute well-known editing techniques, such as morphing or boundary detection between scenes, as well as the novel techniques for speed change special effects of the present invention. Editing controller 134 may also be embodied as a program on a CD-ROM, computer diskette, or other storage media that may be loaded into a removable disk port in disk storage 140 or elsewhere, such as in video clip source 180.

Disk storage 140 comprises one or more disk systems, including removable disks, for permanent storage of programs and other data, including required video and audio data. Depending upon system requirements, disk storage 140 is configured to interface with one or more bidirectional buses for the transfer of video (and audio) data to and from video clip source(s) 180, as well as the rest of the system. Disk storage 140 is capable of transferring data at video rates, as required. Exemplary disk storage 140 is sized to provide adequate storage for several minutes of video for editing purposes in addition to other required space for programs and associated data. Depending upon specific applications and the capability of image processor 120, disk storage 140 can be configured to provide capability for storage of a large number of video clips.

User I/O card 150 provides means for interfacing user device(s) 190 to the rest of video editing system 100. User I/O card 150 converts data received from user devices 190 to the format of interface bus 175 for transfer to image processor 120 or to RAM 130 for subsequent access by image processor 120. User I/O card 150 also transfers data to user output devices such as printers. Video card 160 provides the interface between monitor 185 and the rest of video processing system 110 through data bus 175. In particular, the interface with the rest of the system occurs through the RAM 130 as controlled by image processor 120.

I/O buffer 170 provides an interface between video clip source 180 and the rest of video editing system 100 through bus 175. As previously discussed, video clip source 180 has at least one bidirectional bus for interfacing with I/O buffer 170. I/O buffer 170 is able to transfer data to/from video clip source 180 at the minimum required video image transfer rate. Internal to video processing system 110, I/O buffer 170 transfers data received from video clip source 180 to disk storage 140, to image processor 120, and to RAM 130 to provide temporary storage for editing and monitor display purposes. The simultaneous transfer of the video data to image processor 120 provides means for display of the video image as it is received by the system.

Figure 2:
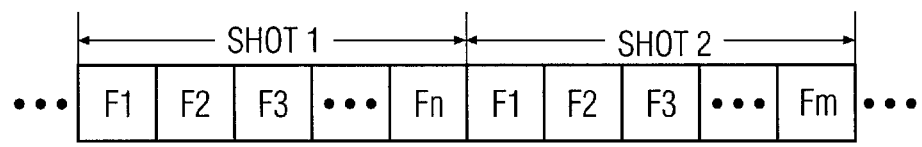
FIG. 2 illustrates an exemplary video clip, which is suitable for editing by the exemplary editing system in FIG. 1.
Figure 2:

Turning next to FIG. 2, illustrated is an exemplary video clip 200, which is suitable for editing by exemplary editing system 100 in FIG. 1. The illustrated portion of exemplary video clip 200 comprises two distinct "shots," namely Shot 1 and Shot 2. Shot 1 (S1) comprises N distinct frames, labeled F1 through Fn in FIG. 2. Shot 2 (S2) comprises M distinct frames, labeled F1 through Fm in FIG. 2. Since the video transfer rate of the image medium is constant, the degree of motion in these shots can be slowed by the duplication and addition of selected frames. Conversely, the motion associated with these shots can be increased through the deletion or removal of selected frames all in accordance with the principles of the present invention.

Figure 3:
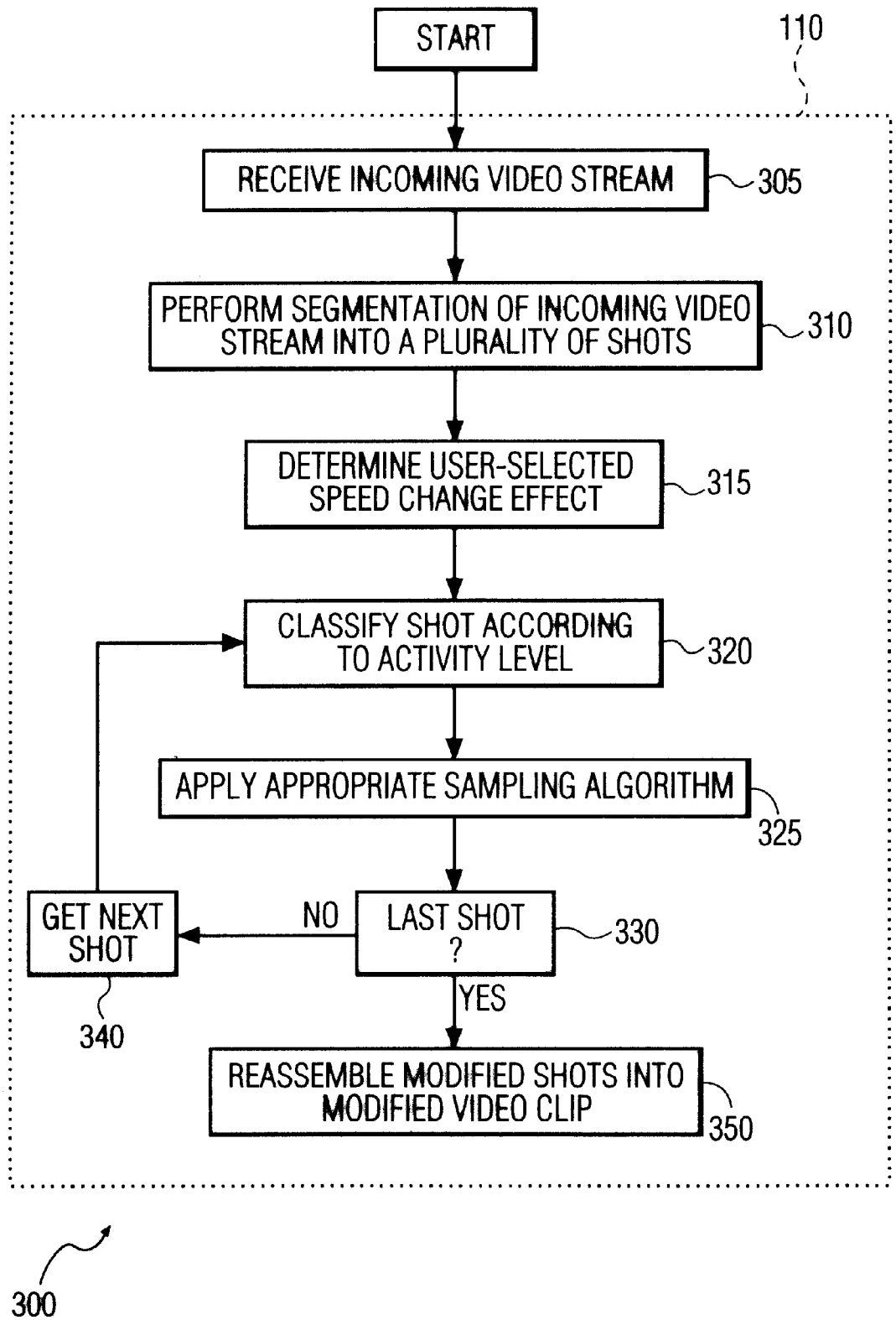
FIG. 3 is a flow diagram which illustrates the operation of an exemplary video processing device in the video editing system in FIG. 1 in accordance with one embodiment of the present invention.

FIG. 3 illustrates an exemplary flow diagram (generally designated 300) delineating a method of operation of video processing system 110, in accordance with one embodiment of the present invention. Flow diagram 300 illustrates an exemplary sequence of steps for modifying the perceived image movement rate of a video clip with consideration given to the amount of movement (or change) between adjacent frames of the same shot. For purposes of illustration, concurrent reference is made to FIG. 1.

Initially, a digitized video stream is received from video clip source 180 via I/O buffer 170 of FIG. 1. This incoming video stream is routed to image processor 120 and RAM 130 for processing and, perhaps, to disk storage 140 for more permanent storage. RAM 130 provides the received video stream as an input to video card 160 for display by monitor 185. Monitor 185 provides the user a visual confirmation of the received visual image (process step 305).

Image processor 120, under control of editing controller 134, examines video clips stored in video clip work space 132 on a frame basis to determine the boundaries, if any, between shots and to segment the video clip into a plurality of individual shots (process step 310). There are a number of well-known techniques for detecting the boundaries between scenes. Any one of these techniques may be used in association with the present invention to segment the video clip into individual shots.

For example, editing controller 134 may utilize sampling methodologies to identify selected groups of pixels which remain substantially unchanged throughout a series of related frames of the video clip. When the selected groups of pixels suddenly change as a result of a change in camera angle, the last frame before the change is identified as the end of one shot. The next frame (i.e., the one in which a significant amount of pixel change occurs) represents the beginning of the next shot. This process continues until the border frames of all shots within the clip have been identified.

As is well known, a shot represents a single camera view with no cuts. It is important that a speed change special effect only be implemented within the borders of a single shot (i.e., between the first and last frames of the shot). Applying a special effect across a shot boundary may result in the generation of erroneous frames or the undesired dropping of frames. This is because the level of activity in one shot may be radically different from the level of activity in a preceding or subsequent shot. Determining the level of activity for a first shot by using at least one frame from a second shot may lead to an erroneous determination of the level of activity in the first shot. Additionally, even if both shots are very low activity level shots, the sudden change in a large number of pixels as the boundary is crossed may lead to an erroneous determination that the activity level of the shot has suddenly become high, when in fact it has not.

In addition, editing controller 134 may provide the user with the option of "manually" segmenting a single shot into multiple sub-shots through the entry of segmentation requirements via user devices 190. This capability may be required for smoothing the movement of single shots which have multiple movement rates within the shot. Ultimately, the received video stream or clip is segmented into a plurality of different shots.

Next, image processor 120 determines the user-selected speed change special effect selected by the user. When a user-selected video speed change is present, editing controller 134 determines whether the play-back speed is to be increased or decreased and by how much (process step 315).

Once the special effect (e.g., fast forward, slow motion) has been determined, image processor 120 examines selected frames within each or the segmented shots in order to determine the level of activity in the video content (process step 320). Starting at the beginning of the shot being processed, the editing program examines the stored image of each frame within the shot. The shot frames are examined to determine the relative degree of movement between successive frames and/or across a longer series of frames within the shot. The shot (or a sub-portion of the shot) may then be classified according to the level of activity in the shot (or sub-portion).

In one embodiment of the present invention, the amount of change between successive frames or across a series of frames may be compared to a threshold value that may be user-defined or may be pre-defined for the particular special effect. Alternatively, the threshold value may be determined as some suitable combination of the same, determined dynamically or statically by the user or the system. Ultimately, the shot (or a sub-portion of the shot) is classified as having a high level of activity or a low level of activity. In some embodiments, numerous activity-level thresholds may be defined and the level of activity may be further refined into three or more levels of activity, such as "very high," "high," "low," "very low," or the like.

Using the shot classification results, editing controller 134 applies the user-selected speed change and calculated sampling algorithm(s) to the shot being processed (process step 325). This results in the introduction of a calculated number of frames being variously duplicated or deleted as determined by the selected speed-change special effect and the level of activity existing movement between frames.

When the speed change for the shot being processed is completed, image processor 120 examines the shot segmentation result to determine if all shots within the clip have been processed (process step 330). If the speed change has not occurred for all shots within the clip, the process continues with the next shot (process step 340). Once individual shots within the clip are processed for speed change, the boundary frames of adjacent shots may be examined and modified, under software control for instance, to eliminate visually abrupt or unacceptable transitions, as specified by the user (video editor). Finally, image processor 120 reassembles the modified shots into a modified video clip for storage in video clip work space 132 or disk storage 140, for display on monitor 185, or for transfer to video clip source 180.

Figure 4A:
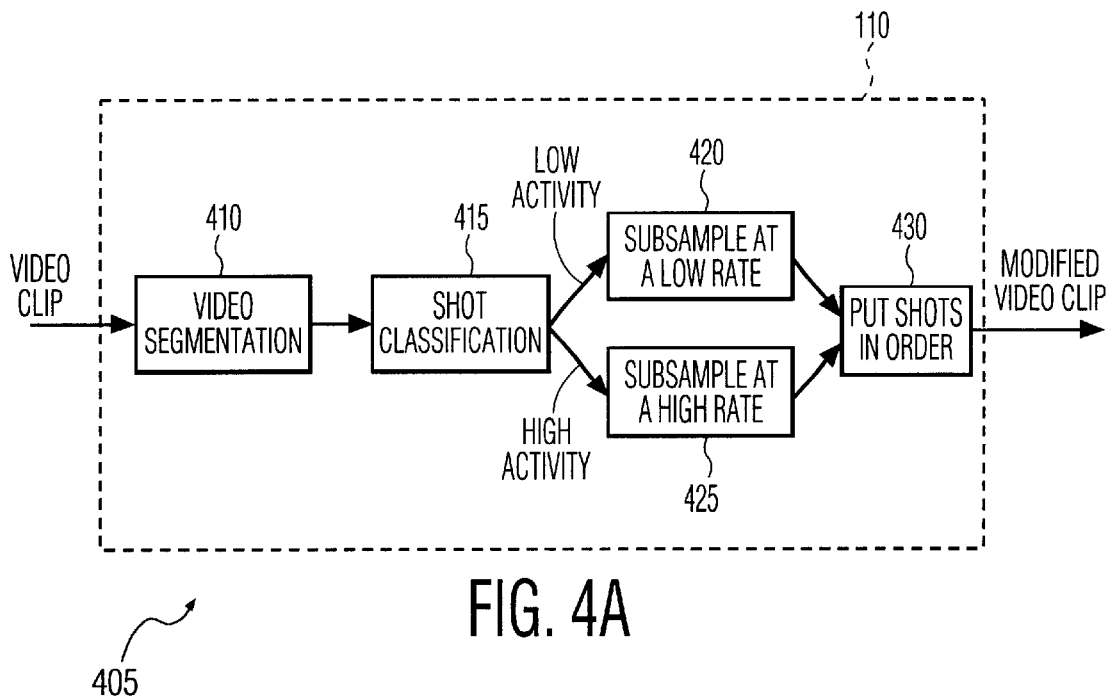
FIG. 4A is a flow diagram which illustrates a fast-forward speed change editing operation in accordance with one embodiment of the present invention; and, FIG. 4B is a flow diagram which illustrates a slow-motion speed change editing operation in accordance with one embodiment of the present invention.

FIG. 4A illustrates an exemplary flow diagram (generally designated 405) delineating a fast-forward method of operation of video processing system 110, in accordance with one embodiment of the present invention. For purposes of illustration, concurrent reference is made to FIGS. 1 and 2.

Initially, the stored video clip received from video clip source 180 is segmented into individual shots, such as Shot 1 and Shot 2 of FIG. 2 (process step 410). Next, the frames within each shot are compared with each other to determine the level of activity in the shot, as previously described (process step 415). The amount of change is equated to the speed of movement within the shot. A shot with frames having rapid movement will have a greater amount of change per pixel location than a shot with frames having less movement.

Thus, if Shot 1 is a stationary shot of a portrait, the amount of difference between adjacent frames in the range S1-F1 through S2-Fn is very small and the degree of activity is low. If Shot 2 is an "action" shot of a hummingbird, the amount of activity is high and the amount of difference between adjacent frames will also be high. The amount of change between frames or across a series of frames is compared across all frames in the shot or all frames in a portion of the shot to determine if the shot (or sub-portion) has a low level or a high level of activity, or some intermediate level of activity.

Once the relative amount of movement within the shot is classified as high to low, the speed of the shot is increased in relation to the original shot by saving sub-samples of frames at a high or low rate. If the shot is classified as low-level activity, the sub-sample occurs at a comparatively low rate (process step 420). The low sub-sample rate results in a relatively smaller number of frames being saved and a relatively larger number of frames being dropped or deleted from the original shot. For example, if the activity level is low in a (or a sub-portion of the shot), image processor 120 may save one out of every three frames and drop the other two frames.

However, if the shot is classified as high-level activity, a high sub-sample rate is used (process step 425). The high sub-sample rate results in a relatively larger number of frames being saved and a relatively smaller number of frames being dropped or deleted from the original shot. For example, if the activity level is high in a shot (or a sub-portion of the shot), image processor 120 may save three out of every four frames and drop only one frame. As noted above, the number of frames dropped may vary dynamically within a shot as the level of activity in the shot varies.

Once each of the shots in the clip have been converted to fast forward format, image processor 120 places the modified shots into the correct sequence (process step 430). The assembled, modified video clip may be stored in video clip work space 132 for further action by image processor 120, including merging with other video clips being processed, or may be stored in disk storage 140.

Figure 4B:
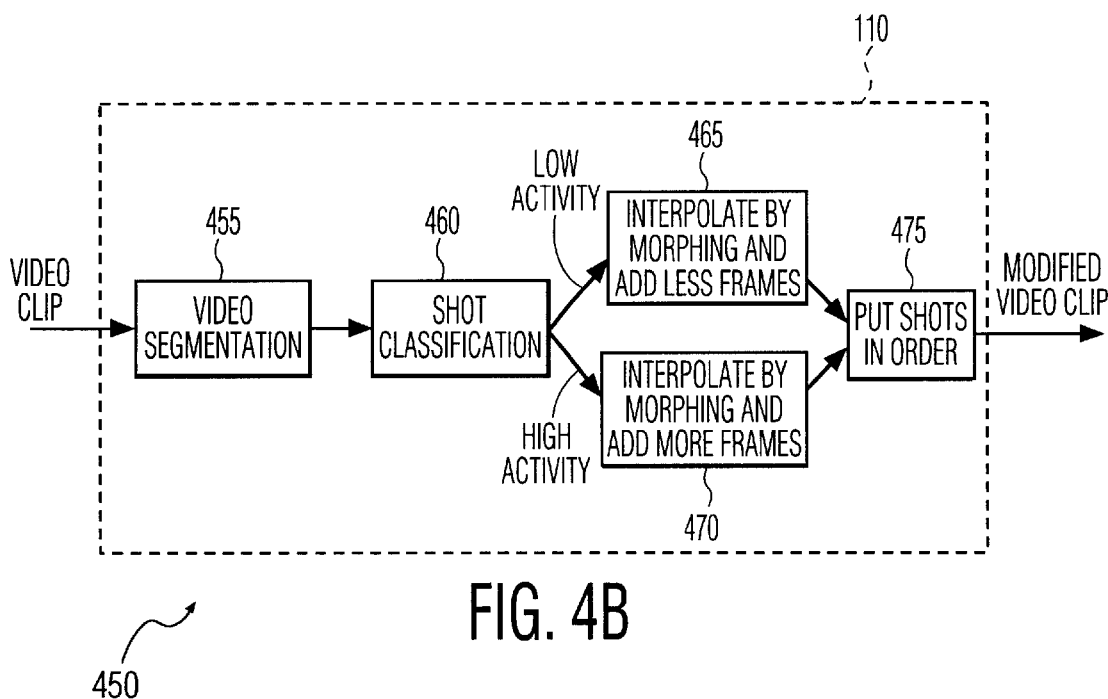

FIG. 4B illustrates an exemplary flow diagram (generally designated 450) delineating a slow-motion method of operation of video processing system 110, in accordance with one embodiment of the present invention. For purposes of illustration, concurrent reference is made to FIGS. 1 and 2.

Initially, the stored video clip received from the video clip source 180 is segmented into individual shots, such as Shot 1 and Shot 2 of FIG. 2 (process step 455). Next, the frames within each shot are compared with each other to determine the level of activity in the shot, as previously described (process step 460). The amount of change is equated to the speed of movement within the shot A shot with frames having rapid movement will have a greater amount of change per pixel location than a shot with frames having less movement.

Once the amount of movement within the shot is classified as high or low, the speed of the shot is decreased in relation to the original shot by adding new frames at a high or low rate. If the shot is classified as low-level activity, the shot is interpolated by morphing adjacent frames and adding new frames at a relatively low rate (process step 465). For example, if the activity level is low in a shot (or a sub-portion of the shot), image processor 120 may morph and add only one frame for every two frames in the original.

However, when the shot is classified as having high activity, the speed may be decreased minimally through the addition of a relatively large number of frames and interpolation or smoothing of frame transitions by the application of morphing techniques 9process step 470). For example, if the activity level is high in a shot (or a sub-portion of the shot), image processor 120 may morph and add two frames for every two frames in the original shot (or sub-portion).

Once each of the shots in the clip have been converted to slow-motion format, image processor 120 places the modified shots into the correct sequence (process step 475). The assembled, modified video clip may be stored in video clip work space 132 for further action by image processor 120, including merging with other video clips being processed, or may be stored in disk storage 140.

In one embodiment of the present invention, the relative rates at which frames are. added during slow-motion speed changes or dropped during fast-forward speed changes may be preset by a user or may be calculated by image processor 120. For example, a user may specify that a video clip is to be played in fast-forward in a period not to exceed five minutes. The rate at which frames are dropped during the fast-forward speed change is then initially calculated by image processor 120 in order to comply with the five minute time constraint. Image processor 120 may then loop through the video clip one or more times to make the final modified video clip play in five minutes or less. Image processor 120 can apply different weighting factors to high-activity level and low-activity level portions of the video clip in order to meet with the specified time duration.

Although the present invention has been described in detail, those skilled in the art should understand that they can make various changes, substitutions and alterations herein without departing from the spirit and scope of the invention in its broadest form.

What is claimed is:

1. For use in a video editing system, a video processing device capable of receiving a first video clip comprising at least one shot, wherein said at least one shot comprises a sequence of related frames, and modifying said video clip to perform a selected speed change special effect, said video processing device comprising:

an image processor capable of identifying said at least one shot and determining a first activity level within at least a first portion of said at least one shot, wherein said first activity level indicates a rate of change of video content between at least a first frame and a second frame in said at least a first portion, wherein said image processor performs said selected speed change special effect by one of adding frames and deleting frames in said at least a first portion in response to said first activity level determination, thereby producing a modified at least one shot.

2. The video processing device set forth in claim 1 wherein said image processor is capable of distinguishing said at least one shot and a second shot in said first video clip and separating said at least one shot and said second shot into distinct segments prior to performing said selected speed change special effect.

3. The video processing device set forth in claim 2 wherein said image processor is capable of determining a second activity level within at least a first portion of said second shot and performing said selected speed change special effect by one of adding frames and deleting frames in said at least a first portion of said second shot in response to said second activity level determination, thereby producing a modified second shot.

4. The video processing device set forth in claim 3 wherein said image processor is capable of combining said modified at least one shot and said modified second shot to thereby produce a modified first video clip.

5. The video processing device set forth in claim 1 wherein said selected speed change special effect is fast forward and said image processor deletes frames at a first predetermined rate if said first activity level does not exceed a first predetermined threshold.

6. The video processing device set forth in claim 5 wherein said image processor deletes frames at a second predetermined rate lower than said first predetermined rate if said first activity level does exceed said first predetermined threshold.

7. The video processing device set forth in claim 1 wherein said selected speed change special effect is slow motion and said image processor adds frames at a first predetermined rate if said first activity level does not exceed a first predetermined threshold.

8. The video processing device set forth in claim 7 wherein said image processor adds frames at a second predetermined rate higher than said first predetermined rate if said first activity level does exceed said first predetermined threshold.

9. A video editing system comprising:

a video processing device capable of receiving a first video clip comprising at least one shot, wherein said at least one shot comprises a sequence of related frames, and modifying said video clip to perform a selected speed change special effect, said video processing device comprising:

an image processor capable of identifying said at least one shot and determining a first activity level within at least a first portion of said at least one shot, wherein said first activity level indicates a rate of change of video content between at least a first frame and a second frame in said at least a first portion, wherein said image processor performs said selected speed change special effect by one of adding frames and deleting frames in said at least a first portion in response to said first activity level determination, thereby producing a modified at least one shot;

a display monitor for displaying said modified at least one shot; and a user input device for receiving user commands capable of selecting said selected speed change special effect.

10. The video editing system set forth in claim 9 wherein said image processor is capable of distinguishing said at least one shot and a second shot in said first video clip and separating said at least one shot and said second shot into distinct segments prior to performing said selected speed change special effect.

11. The video editing system set forth in claim 10 wherein said image processor is capable of determining a second activity level within at least a first portion of said second shot and performing said selected speed change special effect by one of adding frames and deleting frames in said at least a first portion of said second shot in response to said second activity level determination, thereby producing a modified second shot.

12. The video editing system set forth in claim 11 wherein said image processor is capable of combining said modified at least one shot and said modified second shot to thereby produce a modified first video clip.

13. The video editing system set forth in claim 9 wherein said selected speed change special effect is fast forward and said image processor deletes frames at a first predetermined rate if said first activity level does not exceed a first predetermined threshold.

14. The video editing system set forth in claim 13 wherein said image processor deletes frames at a second predetermined rate lower than said first predetermined rate if said first activity level does exceed said first predetermined threshold.

15. The video editing system set forth in claim 9 wherein said selected speed change special effect is slow motion and said image processor adds frames at a first predetermined rate if said first activity level does not exceed a first predetermined threshold.

16. The video editing system set forth in claim 15 wherein said image processor adds frames at a second predetermined rate higher than said first predetermined rate if said first activity level does exceed said first predetermined threshold.

17. A method of operating a video processing system to perform a speed change special effect on a first video clip comprising at least one shot, wherein the at least one shot comprises a sequence of related frames, the method comprising the steps of:

determining a first activity level within at least a first portion of the at least one shot, wherein the first activity level indicates a rate of change of video content between at least a first frame and a second frame in the at least a first portion; and performing one of adding frames and deleting frames in the at least a first portion in response to the first activity level determination, thereby producing a modified at least one shot.

18. The method set forth in claim 17 comprising the further steps of:

distinguishing the at least one shot and a second shot in the first video clip; and separating the at least one shot and the second shot into distinct segments prior to performing the selected speed change special effect.

19. The method set forth in claim 18 comprising the further steps of:

determining a second activity level within at least a first portion of the second shot; and performing one of adding frames and deleting frames in the at least a first portion of the second shot in response to the second activity level determination, thereby producing a modified second shot.

20. The method set forth in claim 19 comprising the further step of combining the modified at least one shot and the modified second shot to thereby produce a modified first video clip.

21. For use in a video editing system, computer executable process steps stored on a computer readable storage medium for performing a speed change special effect on a first video clip comprising at least one shot, wherein the at least one shot comprises a sequence of related frames, the computer executable steps comprising:

determining a first activity level within at least a first portion of the at least one shot, wherein the first activity level indicates a rate of change of video content between at least a first frame and a second frame in the at least a first portion; and performing one of adding frames and deleting frames in the at least a first portion in response to the first activity level determination, thereby producing a modified at least one shot.

22. The computer executable process steps, stored on a computer readable storage medium, set forth in claim 21 comprising the further steps of:

distinguishing the at least one shot and a second shot in the first video clip; and separating the at least one shot and the second shot into distinct segments prior to performing the selected speed change special effect.

23. The computer executable process steps, stored on a computer readable storage medium, set forth in claim 22 comprising the further steps of:

determining a second activity level within at least a first portion of the second shot; and performing one of adding frames and deleting frames in the at least a first portion of the second shot in response to the second activity level determination, thereby producing a modified second shot.

24. The computer executable process steps, stored on a computer readable storage medium, set forth in claim 23 comprising the further step of combining the modified at least one shot and the modified second shot to thereby produce a modified first video clip.

* * * * *